US012671582B2

(12) United States Patent     (10) Patent No.:   US 12,671,582 B2
Vaid et al.     (45) Date of Patent:   Jun. 30, 2026

(54) TECHNIQUES FOR ALTERNATIVE DATA EXCHANGE MECHANISMS AT TERMINAL DEVICES

(71) Applicant: Apple Inc., Cupertino, CA (US)

(72) Inventors: Yousuf H. Vaid, Fremont, CA (US); Freddy Kelly, London (GB); Vineet Chadha, Santa Cruz, CA (US); Michael Artemiw, San Jose, CA (US); Mark R. Danks, London (GB); Richard W. Heard, San Francisco, CA (US); Andrey Tokarev, London (GB); Katie M. McIndoe, San Jose, CA (US); John L. Furlan, Emerald Hills, CA (US); James Allured, London (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/893,792

(22) Filed: Sep. 23, 2024

(65) Prior Publication Data

US 2025/0378440 A1     Dec. 11, 2025

Related U.S. Application Data

(60) Provisional application No. 63/657,696, filed on Jun. 7, 2024.

(51) Int. Cl.
| | |
|---|---|
| *G06Q 20/38* | (2012.01) |
| *H04B 5/72* | (2024.01) |
| *H04L 9/32* | (2006.01) |

(52) U.S. Cl.
CPC ........... *H04L 9/32* (2013.01); *G06Q 20/3825* (2013.01); *H04B 5/72* (2024.01)

(58) Field of Classification Search
CPC ......... G06Q 20/3825; H04B 5/72; H04L 9/32
(Continued)

(56) References Cited

U.S. PATENT DOCUMENTS

| | | | |
|---|---|---|---|
| 12,217,268 B2 * | 2/2025 | Ho | G06Q 20/401 |
| 2012/0259782 A1 | 10/2012 | Hammad | |

(Continued)

FOREIGN PATENT DOCUMENTS

| | | |
|---|---|---|
| WO | 2013155627 A1 | 10/2013 |
| WO | 2016128257 A1 | 8/2016 |

(Continued)

OTHER PUBLICATIONS

Pelegero, "Payment Insecurity: How Visa and Mastercard Use Standard-Setting to Restrict Competition and Thwart Payment Innovation", Retail Payments Global Consulting Group LLC, Dec. 2019, 56 pages (Year: 2019).*

(Continued)

*Primary Examiner* — James D Nigh
(74) *Attorney, Agent, or Firm* — Kilpatrick Townsend & Stockton LLP

(57) ABSTRACT

Techniques are disclosed for implementing a data exchange account at a user device. An application executing on a user device can initiate a data exchange session with a terminal device and determine that a data exchange account is not associated with the user device. The application can then obtain, from a server device, a list comprising a plurality of third party service providers and present the list at a display of the user device. The application can then receive an indication that a third party service provider of the plurality of third party service providers has been selected. In response, the application can transmit a request to associate the data exchange account with the user device. The application can receive data exchange account information comprising a token and transmit a data cryptogram generated by the application using the token.

20 Claims, 8 Drawing Sheets

200

(58) Field of Classification Search
USPC ........................................................ 705/65
See application file for complete search history.

(56) References Cited

U.S. PATENT DOCUMENTS

| | | | |
|---|---|---|---|
| 2014/0114857 A1 | 4/2014 | Griggs et al. | |
| 2014/0162598 A1 | 6/2014 | Villa-Real | |
| 2014/0244494 A1 | 8/2014 | Davis et al. | |
| 2016/0048864 A1 | 2/2016 | Beer et al. | |
| 2016/0260117 A1 | 9/2016 | Yen et al. | |
| 2016/0381010 A1 | 12/2016 | Bhandari et al. | |
| 2017/0017951 A1 | 1/2017 | Lee et al. | |
| 2019/0287093 A1 | 9/2019 | Perry | |
| 2019/0325472 A1 | 10/2019 | Pirillo | |
| 2019/0385160 A1 | 12/2019 | Safak et al. | |
| 2020/0027076 A1 | 1/2020 | Sharma et al. | |
| 2020/0058047 A1 | 2/2020 | Khan et al. | |
| 2020/0322800 A1* | 10/2020 | Ozanian | G06N 3/045 |
| 2020/0380483 A1 | 12/2020 | Kang | |
| 2020/0410483 A1 | 12/2020 | Dill et al. | |
| 2021/0097535 A1 | 4/2021 | Osborn et al. | |
| 2022/0391874 A1 | 12/2022 | Pezewski et al. | |
| 2024/0346477 A1 | 10/2024 | Meckler et al. | |

FOREIGN PATENT DOCUMENTS

| | | | | |
|---|---|---|---|---|
| WO | 2021011752 A1 | 1/2021 | | |
| WO | 2022265732 A1 | 12/2022 | | |
| WO | 2023049416 A1 | 3/2023 | | |
| WO | 2024191341 A1 | 9/2024 | | |
| WO | WO-2025071896 A1 * | 4/2025 | .......... | G06Q 20/326 |

OTHER PUBLICATIONS

Data Exchange Services Specifications—GXFSv2—Data Exchange—22.10 Release, 17 pages (Year: 2025).*

Document retrieved from https://web.archive.org/web/20240527191823/https://docs.snowflake.com/en/user-guide/data-exchange, date of publication May 27, 2024, 2 pages (Year: 2024).*

O'Connor "Data Exchange: How Does it Work?", retrieved from https://www.lotame.com/resources/back-basics-data-exchange-work/, Nov. 14, 2023, 11 pages (Year: 2023).*

Invitation to Pay Additional Fees and, Where Applicable, Protest Fee issued in PCT Application No. PCT/US2025/032499, dated Oct. 9, 2025 in 11 pages.

International Search Report and Written Opinion Received issued in PCT Application No. PCT/US2025/032499, dated Dec. 2, 2025 in 18 pages.

Non-Final Office Action issued in U.S. Appl. No. 18/893,727, dated Dec. 23, 2025 in 25 pages.

Final Office Action issued in U.S. Appl. No. 18/893,727, dated May 19, 2026 in 29 pages.

* cited by examiner

300

500

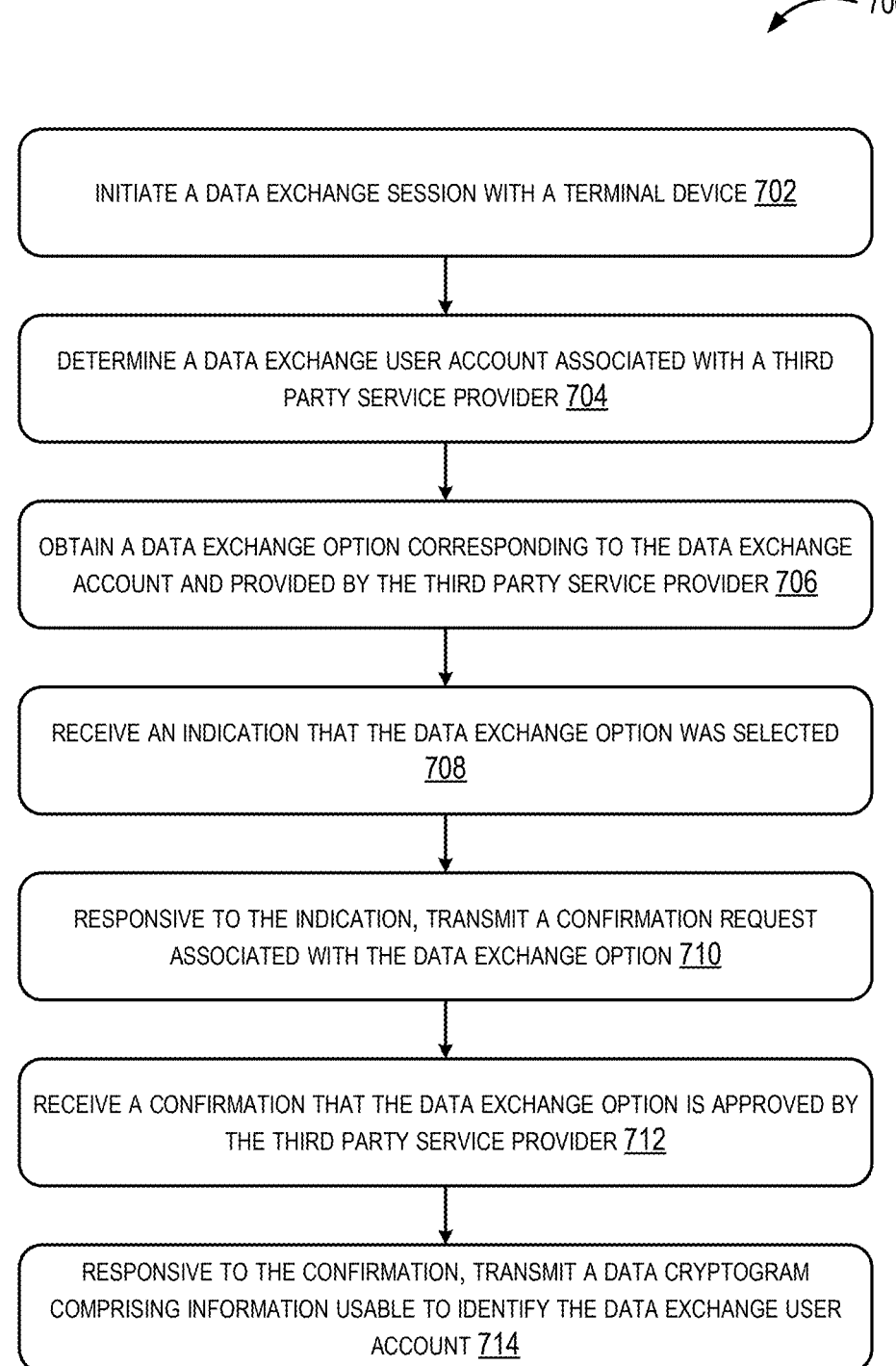

700

INITIATE A DATA EXCHANGE SESSION WITH A TERMINAL DEVICE 702

DETERMINE A DATA EXCHANGE USER ACCOUNT ASSOCIATED WITH A THIRD PARTY SERVICE PROVIDER 704

OBTAIN A DATA EXCHANGE OPTION CORRESPONDING TO THE DATA EXCHANGE ACCOUNT AND PROVIDED BY THE THIRD PARTY SERVICE PROVIDER 706

RECEIVE AN INDICATION THAT THE DATA EXCHANGE OPTION WAS SELECTED 708

RESPONSIVE TO THE INDICATION, TRANSMIT A CONFIRMATION REQUEST ASSOCIATED WITH THE DATA EXCHANGE OPTION 710

RECEIVE A CONFIRMATION THAT THE DATA EXCHANGE OPTION IS APPROVED BY THE THIRD PARTY SERVICE PROVIDER 712

RESPONSIVE TO THE CONFIRMATION, TRANSMIT A DATA CRYPTOGRAM COMPRISING INFORMATION USABLE TO IDENTIFY THE DATA EXCHANGE USER ACCOUNT 714

FIG. 7

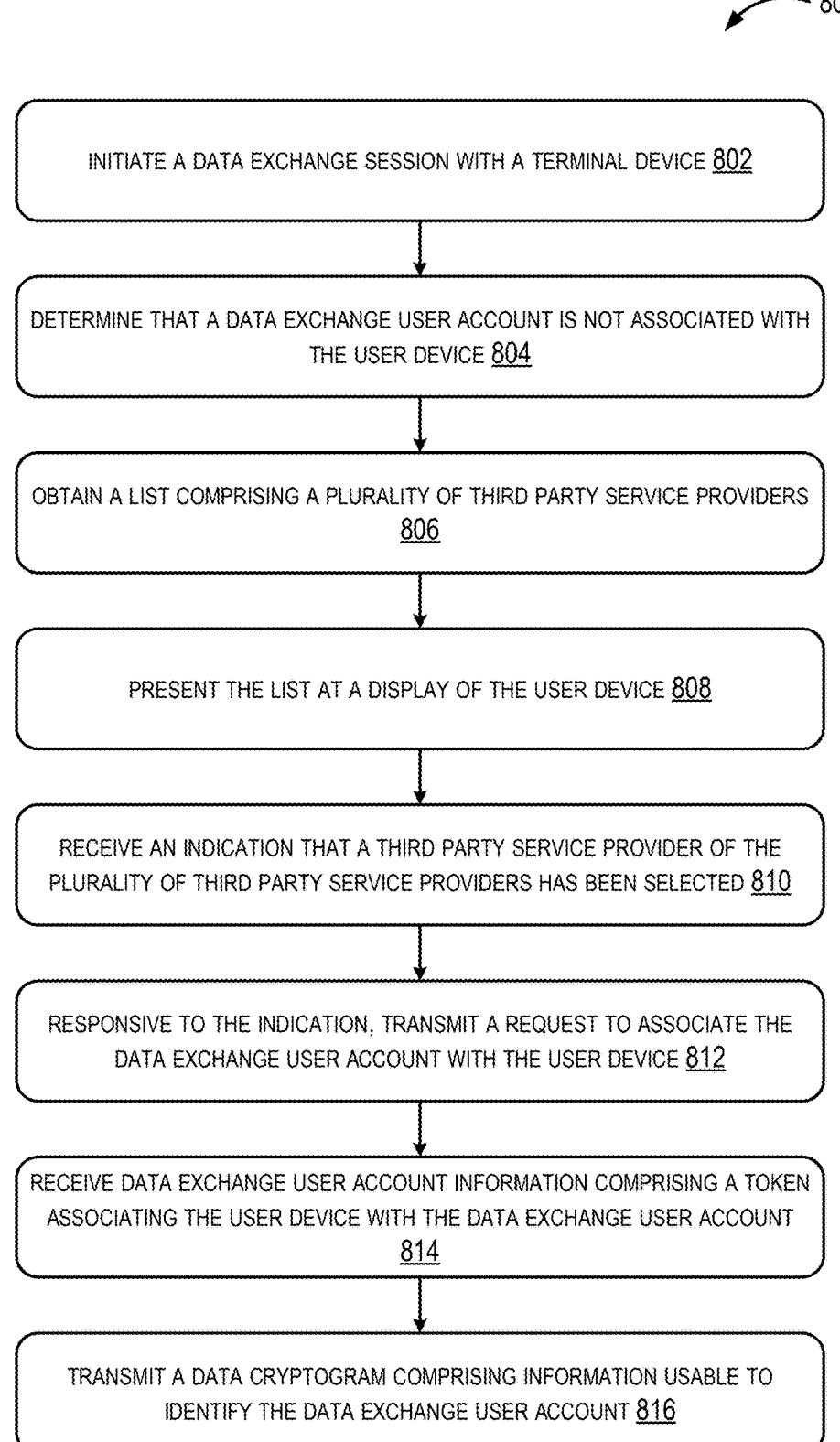

800

INITIATE A DATA EXCHANGE SESSION WITH A TERMINAL DEVICE 802

DETERMINE THAT A DATA EXCHANGE USER ACCOUNT IS NOT ASSOCIATED WITH THE USER DEVICE 804

OBTAIN A LIST COMPRISING A PLURALITY OF THIRD PARTY SERVICE PROVIDERS 806

PRESENT THE LIST AT A DISPLAY OF THE USER DEVICE 808

RECEIVE AN INDICATION THAT A THIRD PARTY SERVICE PROVIDER OF THE PLURALITY OF THIRD PARTY SERVICE PROVIDERS HAS BEEN SELECTED 810

RESPONSIVE TO THE INDICATION, TRANSMIT A REQUEST TO ASSOCIATE THE DATA EXCHANGE USER ACCOUNT WITH THE USER DEVICE 812

RECEIVE DATA EXCHANGE USER ACCOUNT INFORMATION COMPRISING A TOKEN ASSOCIATING THE USER DEVICE WITH THE DATA EXCHANGE USER ACCOUNT 814

TRANSMIT A DATA CRYPTOGRAM COMPRISING INFORMATION USABLE TO IDENTIFY THE DATA EXCHANGE USER ACCOUNT 816

FIG. 8

TECHNIQUES FOR ALTERNATIVE DATA EXCHANGE MECHANISMS AT TERMINAL DEVICES

CROSS-REFERENCES TO OTHER APPLICATIONS

The present application claims priority to U.S. Provisional Patent Application No. 63/657,696, filed Jun. 7, 2024, which is hereby incorporated by reference in its entirety.

BACKGROUND

Modern user devices can allow users to interact with various other computer devices to receive services from online service providers, complete transactions, and other data exchange mechanisms. The ecosystems of devices, device applications, service providers can be complex, so that a single data exchange between an application at a user device and a computing device can require additional service providers preconfigured with the computing device to complete the data exchange. There is therefore a need for improved techniques to facilitate data exchanges between user devices and computing devices.

BRIEF SUMMARY

Embodiments of the present disclosure relate to data exchange mechanisms between an application at a user device and another computing device. More particularly, embodiments of the present disclosure provide methods, user devices, and computer-readable media that can determine data exchange options for a data exchange session between an application executing on a user device and another computing device. In a typical data exchange session, the application at the user device and the other computing device may be configured to perform the data exchange in a particular fashion, for example, according to a predetermined protocol or format for the exchanged data. The other computing device may be a terminal device configured to process data exchanges with the user device (or other user devices) and may complete the data exchange by accessing one or more other computing devices or service providers to verify, validate, or otherwise confirm the data exchange. Beyond the typical data exchange mechanism, the user device may have access to one or more additional options for completing the data exchange, with the options provided by a third party service provider. To preserve user privacy and improve the functionality of the user device and terminal device when making the data exchange, the application at the user device can be configured to determine the available options for the data exchange without the terminal device needing to be provisioned to recognize the data exchange options.

One embodiment is directed to a method performed by an application executing on a user device. The method can include initiating a data exchange session with a terminal device and determining a data exchange account associated with a third party service provider. The method can also include obtaining, from a server device, a data exchange option corresponding to the data exchange account and provided by the third party service provider. The server device can maintain association information for the third party service provider. The method can also include receiving an indication that the data exchange option was selected and, responsive to the indication, transmitting, to the server device, a confirmation request associated with the data exchange option. The method can also include receiving, from the server device, a confirmation that the data exchange option is approved by the third party service provider, and responsive to the confirmation, transmitting, by the application to the terminal device within the data exchange session, a data cryptogram comprising information usable to identify the data exchange account.

Another embodiment is directed to a method performed by an application executing on a user device. The method can include initiating a data exchange session with a terminal device and determining that a data exchange account is not associated with the user device. The method can also include obtaining, from a server device, a list comprising a plurality of third party service providers, presenting the list at a display of the user device, and receiving an indication that a third party service provider of the plurality of third party service providers has been selected. The method can also include, in response to the indication, transmitting, to the server device, a request to associate the data exchange account with the user device, the data exchange account provided by the third party service provider. The method can also include receiving, from the server device, data exchange account information comprising a token associating the user device with the data exchange account and transmitting, to the terminal device within the data exchange session, a data cryptogram comprising information usable to identify the data exchange account, the data cryptogram generated by the application using the token.

Another embodiment is directed to a user device that includes one or more processors and one or more memories storing instructions that, when executed by the one or more processors, cause the user device to execute an application configured to perform any of the methods described above.

Still another embodiment is directed to a non-transitory computer-readable medium storing computer-executable instructions that, when executed by one or more processors of a user device, cause the user device to execute an application configured to perform any of the methods described above.

BRIEF DESCRIPTION OF THE DRAWINGS

FIG. 7 illustrates an example process for determining a data exchange option for use in a data exchange session between an application executing at a user device and a terminal device, according to some embodiments.

FIG. 8 illustrates an example process for creating a new data exchange account for use in a data exchange session between an application executing at a user device and a terminal device, according to some embodiments.

DETAILED DESCRIPTION

Figure 1:
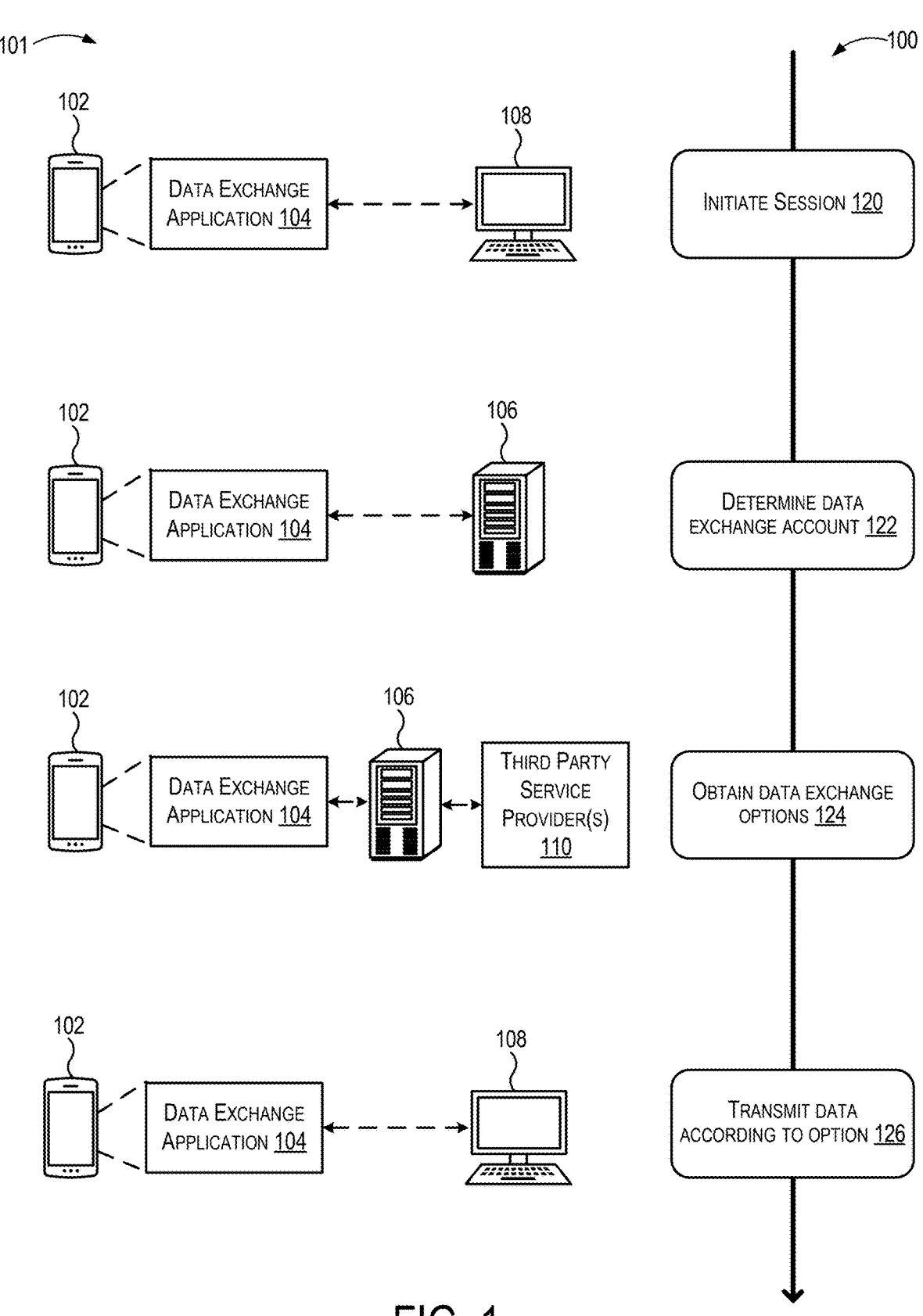
FIG. 1 illustrates a simplified flow chart and block diagram of a technique to determine a data exchange option while in a data exchange session between a user device and a terminal device, according to some embodiments.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, methods, systems, devices, and computer-readable media that enable alternative data exchange options for completing a data exchange between a user device and another computing device. A data exchange, as used herein, can refer to a particular transmission and/or reception of defined data between the user device and the other computing device according to a defined protocol and in which the user device and/or computing device may be configured to perform additional operations outside the data exchange session to verify and/or validate the exchange. As described briefly above, the other computing device may be a terminal device configured to process data exchanges with the user device and may access, for example, additional computing devices or service providers over a separate network to verify, validate, or otherwise confirm the data exchanged with the user device. In a conventional data exchange session, the user device and the terminal device may exchange data in particular formats to preserve user and data privacy, so that the terminal device communicates with the network of additional devices to validate the exchange, because the terminal device cannot or is not permitted to access identifiable information within the exchanged data. For example, in a payment transaction between a user device and a point of sale (POS) terminal, the user device may transmit tokenized data to the POS terminal to satisfy a payment for a service or item. Because the data is tokenized, the POS terminal may not be able to directly confirm the authenticity of the payment information provided by the user device. The POS terminal can then communicate with a payments processing network to validate the tokenized payment information to confirm and complete the transaction.

Conventionally, the terminal device must be configured to access the particular processing networks to confirm the data transactions. the terminal device itself may not be permitted access to user specific information related to a user account or other identifiable user information that may be needed to complete the data exchange. Instead, the processing networks and third party service providers perform authentication and authorization operations and provide corresponding indications to the terminal device. However, the third party service providers may provide to a user additional options for completing a data exchange. Returning to the particular example payment processing, a third party service provide may provide to a user the ability to complete a transaction using a non-currency option (e.g., rewards points). Such an option would typically be processed after the fact, so that the user would complete a traditional payment transaction with a terminal device using currency (e.g., paying with a credit card) and then later requesting a statement credit on the basis of the reward points. To implement the non-currency payment during the initial payment transaction, the terminal device would need to be configured to both accept the non-currency option and obtain and/or transmit information specific to the user making the transaction. Such an integration between terminal devices and third party service providers can be computationally complex due to the variety of terminal devices (e.g., number of different merchants) and the need to provide data security for information needed to provide non-currency options (e.g., user account information corresponding to the non-currency option).

The techniques described herein avoid the computational complexity and data security vulnerabilities of integrating third party service provider information at the terminal devices by performing the authentication and confirmation of data exchange options over an existing communication pathway between the user device used in the data exchange to a server device (e.g., a first party server device) already associated with the user device and the third party service providers. In this way, the data exchange session between the user device and the terminal device can complete in the manner expected by the terminal device. During the data exchange session, the user device can communicate with the server device to obtain data exchange options as well as determine whether a selected data exchange option is approved by a third party service provider. Based on the approval obtained via the communication path from user device to server device to third party service provider, the user device can complete the data exchange with the terminal device by transmitting tokenized data to the terminal device. When the terminal device subsequently communicates with a processing network (e.g., a network for communicating with the third party service providers) to verify the transaction using the tokenized data from the user device, the transaction will be approved and completed at the terminal device using a typical option (e.g., currency) but will be completed with respect to a data exchange account of the user device using the selected option (e.g., rewards points).

As a first particular example, a user device can execute an application (e.g., a payment application) for a data exchange session. The application can initiate the data exchange session with a terminal device. During the data exchange session, the application can determine a data exchange account associated with a third party service provider. For example, the application can determine a payment method for completing a payment transaction, with the payment method associated with account information for a user of the user device. The application can then obtain data exchange options for the data exchange account. To do this, the application can communicate with a server device that maintains data exchange account information and association information between the data exchange accounts and the third party service providers. For example, the server device can be a first party server device used to provision data exchange account information on the user device for a particular user. In response to the communication from the application, the server device can request data exchange options for the data exchange account from the third party service provider. For example, the third party service provider may be a credit card issuer that also offers installment payment options for a user. The server device can obtain the installment payment option from the credit card issuer for the user and provide that option information to the application at the user device during the data exchange session. The application can present the data exchange option at the user device, after which the user can select the data exchange option (or another available option). Based on the selection, the application can request confirmation of the data exchange option. The request for confirmation can be first transmitted to the server device and then to the third party service provider. If the data exchange option is confirmed, the confirmation can be transmitted back to the user device via the server device. In response to the confirmation, the application can complete the data exchange by transmitting a data cryptogram to the terminal device. The data cryptogram can include a token or other information usable by the terminal device to validate the transaction with the third party service provider via its own communication channel (e.g., a payment processing network). From the perspective of the terminal device, the data exchange completes as a typical exchange using the particular protocol or data format. From the perspective of the application at the user device, the transaction will be completed with the third party service provider based on the confirmed data exchange option.

As a second particular example, a user device can execute an application for a data exchange session. The application can initiate the data exchange session with a terminal device. During the data exchange session, the application can determine that no data exchange account exists for use at the user device. For example, a user may not have provisioned a payment method at the user device, or may only have payment methods that do not support data exchange options. The application can obtain a list of third party service providers that are available to support the data exchange between the user device and the terminal device. The list of third party service providers can be obtained by a server device that maintains information associating the third party service providers with user account information for the user device. The list of third party service providers can be presented at the user device by the application. A user can select one of the third party service providers to create a data exchange account. Based on the selection, the application can send the request for the new data exchange account to the server device, which can in turn send the request to the third party service provider. The third party service provider can create the data exchange account and provide the server device a token and/or other information that is usable to associate the data exchange account with the user device. The server device can send the token to the user device, where it can be stored in a secure storage and usable by the application as part of the data exchange. Once the data exchange account is created, the application can continue the data exchange with the terminal device by transmitting a data cryptogram including the token to the terminal device. In some cases, the application can also check for data exchange options related to the new data exchange account as described above in the first particular example. As with the previous example, the terminal device can complete the data exchange by communicating with a processing network or other communication channel to have the token and/or other transaction information validated by the third party service provider.

The examples described herein provide a number of technical improvements to address a number of technical problems as compared to conventional systems and techniques. When an association exists between a user and a third party service provider, for example with a particular user account, the user account can include sensitive information like account identifiers, user device identifiers, a user's name, and other personally identifiable information. If this information is needed to successfully complete transactions with respect to the user account, techniques like tokenization and cryptographic exchanges can be employed to preserve the security of the information. However, the security of the information can break down if additional computing systems like terminal devices are integrated with third party service provider information. For example, to make non-currency payments available at a POS, the POS would need to be able to verify the status of the user account with the third party service provider with respect to the non-currency option. Even if the explicit values were obfuscated using privacy-preserving techniques, the fact that the POS requests and receives confirmation about a non-currency or other optional data exchange mechanism can implicitly reveal information about the user account, including credit availability, spending habits, and rewards points balances. By implementing the techniques described herein, the data exchange options are made available to the application while improving the security posture of user device with respect to the terminal device. Moreover, the terminal devices do not maintain either the data exchange account information or the additional protocols to check for data exchange options with the third party service providers, reducing computational expenditures within the data exchange system.

Similarly, when the application determines that no data exchange mechanism is currently available at the user device, the application and initiate a process to create a data exchange account while in the data exchange session. The creation of the new data exchange account occurs with an interface between the user device, a first-party server device, and the third party service provider, which provides data security for credentials and other data generated to create the data exchange account. In addition, the creation of the new data exchange account allows the original data exchange to be completed successfully. If the data exchange session terminates unsuccessfully, computational resources are wasted either performing another data exchange session or waiting for a data exchange account to be created separately and then provisioned onto the user device.

Although the techniques described herein for data exchange make reference to the particular illustrative example of payment transactions, the technical benefit can be applied to other data exchange scenarios. For example, the data exchange session can include the transmission of access credentials in which a different level of access can be granted as a data exchange option. As another example, the third party service provider can provide an additional service to the user via the data exchange at the terminal device. For instance, the third party service provider may update user account information for the user at the third party service provider based on the data exchange. And within the context of payment transactions, the techniques described herein provide additional advantages that improve the functioning of the described computer systems. For example, the third party service provider can separately provide additional services like rewards points credit to a user's account, item purchase protection, and price matching for the data exchange session. Because these additional services are provided through the user device during the data exchange session, the corresponding service can be implemented during the session so that additional communications between the user device and the third party service provider are not needed, thus reducing the amount of data transmitted between the user device and the third party service provider to implement the additional services. Additional data exchange scenarios are contemplated.

Turning now to the figures, FIG. 1 illustrates a simplified flow chart and block diagram of an example process 100 to determine a data exchange option while in a data exchange session between a user device 102 and a terminal device 108, according to some embodiments. The diagram 101 includes a user device 102, a terminal device 108, and a server device 106, which may be examples of computer devices that are configured to communicate over one or more networks to perform data exchange operations, including obtaining data exchange options, creating new data exchange accounts, and confirming and/or validating a data exchange or a data exchange option. The user device 102 is illustrated as a smartphone. In some embodiments, the user device 102 can be any suitable user device including smartphone, tablet, laptop computer or other similar device that allows a data exchange application 104 to communicate with the terminal device 108. In some examples, the user device 102 may include one or more applications, including data exchange application 104, which may include custom-built algorithms and other logic, code, or executable instructions, to enable performance of at least some of the techniques described herein. The user device 102 may also include storage media for storing computer-executable instructions (e.g., that make up the application) and other data described herein, including tokens and data exchange account information. The user device 102 may be operated by a user.

Similarly, the server device 106 may be any suitable computing device or arrangement of one or more computing devices that can be configured to perform the operations described herein and communicate with the user device 102 for performing data exchange operations. In some embodiments, the server device 106 can be one or more virtual machines implemented within a cloud computing or other hosted environment. The cloud computing environment may include provisioned computing resources like compute, storage, and networking. For example, the server device 106 can include cloud-based computing with associated storage for maintaining data exchange account information and association information for associating the data exchange accounts with one or more third-party service providers.

The terminal device 108 may be a suitable computing device for communicating with the user device 102 in a data exchange session. In some examples, the terminal device 108 may be a point of sale (POS) system that can communicate with the user device using near-field communication (NFC) for the exchange of information to effect a payment transaction. In some other examples, the terminal device 108 may be a server computer or computers, including computing instances implemented in a cloud-computing environment, that can provide network resources (e.g., a web page) to the user device 102 as part of the data exchange session. For example, the user device 102 can initiate a payment transaction at a webpage of an online merchant, so that the terminal device 108 is the computing system of the merchant that provides payment exchange. Beyond the use in payments, the terminal device 108 could be an access control terminal for providing access to various locations. Additional details about exemplary user devices, server devices, and terminal devices like user device 102, terminal device 108, and server device 106 are described below with respect to FIG. 6.

The process 100, and any other process described herein (e.g., processes 700 and 800 of FIGS. 7-8, respectively) are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer-readable storage medium, for example, in the form of a computer program including a plurality of instructions executable by one or more processors.

The process 100 can begin at block 120 when the data exchange application 104 initiates a data exchange session with the terminal device 108. For example, the data exchange application 104 may be a wallet application or a payment application executing on the user device 102. Initiating the data exchange session can include one or more communications between the user device 102 and the terminal device 108 that establish the session and associated communication channels. For example, the user device 102 may be brought near the terminal device 108 and initiate the data exchange session via near-field communication to make a payment. The data exchange session can include the payment or transaction process in which the user device can transmit transaction information or other data for the exchange and for which the user device can receive additional inputs like user confirmations.

At block 122, once the data exchange session has been initiated, the data exchange application 104 can determine a data exchange account. Determining the data exchange account can include receiving a user selection of one data exchange account from a plurality of data exchange accounts associated with the user device 102. For example, the data exchange application 104 may store multiple payment methods, with each separately associated with an account. During the data exchange session, the user can select an available payment method. In some embodiments, the user device can communicate with a server device 106 to obtain information about the available data exchange accounts. The server device 106 may be associated with the user device 102 and the data exchange application 104. For example, the server device 106 may be a server of an entity providing the data exchange application 104, so that the server device 106 maintains data exchange account information associated with the user device 102. The server device 106 can also maintain association information that links the data exchange accounts with the associated third party service providers. For example, the third party service providers can be onboarded with the entity providing the server device 106 so that the server device 106 is provisioned with identifiers for the third party service provider (e.g., bank identification numbers), network resources (e.g., uniform resource locators), certificates to enable cryptographically secure communications (e.g., transport layer security certificates), and identifiers for associated applications and stores (e.g., online web stores) that have an existing relationship with the third party service provider. The server device 106 can use the maintained information to communicate with the corresponding third party service provider to determine the available data exchange accounts. For example, the server device 106 can indicate to the data exchange application 104 that only a certain data exchange account is acceptable for the data exchange session based on the identifiers for associated stores.

At block 124, the data exchange application 104 can obtain data exchange options. The data exchange application 104 can query a server device 106 to obtain the data exchange options. In a particular example, the data exchange options can include the ability to pay for an item or service using a non-currency option like rewards points offered by the third party service provider (and not directly through the terminal device). In another particular example, the data exchange options can include the ability to pay with an installment payment plan or a pay-over-time plan offered by the third party service provider. In some examples, the third party service provider can provide the data exchange options for multiple associated data exchange accounts. For example, if the data exchange application 104 includes multiple data exchange accounts that correspond to the same third party service provider 110, the server device 106 can query the particular third party service provider 110 and obtain data exchange options for all corresponding data exchange accounts including the data exchange account determined in block 122. Based on the available data exchange options, the data exchange application 104 can receive an indication of a selection of a different data exchange option.

At block 126, the data exchange application 104 can transmit data according to a selected data exchange option. The data exchange application 104 can present the data exchange options received in block 124 at a display of user device 102. Based on a selection of one of the data exchange options, the data exchange application can transmit a confirmation request to the server device 106, which can subsequently relay the request to the corresponding third party service provider 110. The confirmation request may be approved by the third party service provider 110, after which the confirmation is transmitted back to the data exchange application 104 at the user device. Once the confirmation is received, the data exchange application 104 can transmit the data to the terminal device 108. The data transmitted to the terminal device 108 can include transaction information (e.g., price, identifier for the third party service provider 110) and a token usable by the terminal device 108 to validate the transaction. For example, when paying for an item or service, the terminal device 108 can validate the transaction by contacting a payment processing network that can use the token to verify the transaction with the third party service provider 110. Notably, the data transmitted to the terminal device 108 need not indicate the data exchange option. Instead, the terminal device 108 can receive data according to a typical protocol or format. The confirmation of the transaction and the successful closing of the data exchange session can occur without the terminal device obtaining specific information related to the data exchange option.

Figure 2:
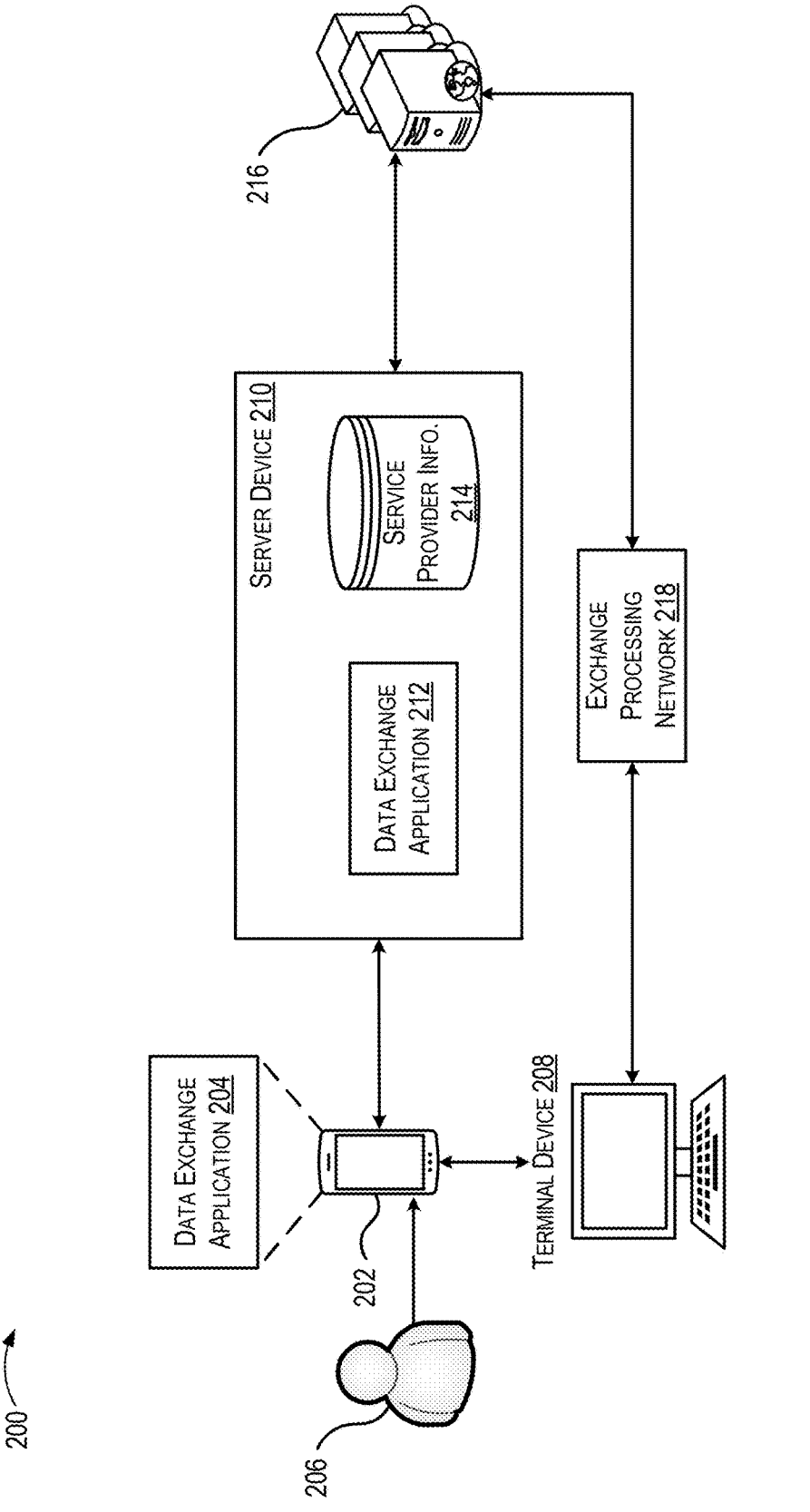
FIG. 2 illustrates a simplified architecture of a data exchange session in which data exchange options are provided by a third party service provider, according to some embodiments.

FIG. 2 illustrates a simplified architecture of a system 200 that can host a data exchange session in which data exchange options are provided by a third party service provider 216, according to some embodiments. The system 200 includes a user device 202, a terminal device 208, and a server device 210, which may be examples of user device 102, terminal device 108, and server device 106 of FIG. 1, respectively.

The user device 202 can execute a data exchange application 204, which may be an example of data exchange application 104 described above with respect to of FIG. 2.

Similarly to some operations of process 100 described above in FIG. 1, the data exchange application 204 can be configured to communicate with both the terminal device 208 and the server device 210. The data exchange application 204 can initiate the data exchange session with the terminal device 208 by establishing a communication connection with the terminal device 208. In some examples, the data exchange session can be a payment transaction, such that the terminal device 208 is a point of sale device. In other examples, the data exchange session can be an online payment transaction, such that the terminal device 208 is a server providing the network resource (e.g., webpage) for the payment transaction. The communication between the user device 202 and the terminal device 208 can be a near-field communication channel. In some embodiments, the communication between the user device 202 and the terminal device can be a network connection over one or more networks, including wired networks, wireless networks, cellular networks, and/or other networks. In some embodiments, the user 206 can provide inputs to the data exchange application 204 via an interface (e.g., touch screen, physical button) of the user device 202 to make selections to initiate, advance, or complete the data exchange session.

Server device 210 can include data exchange application 212. The data exchange application 212 can be a server-side application configured to implement the operations performed by server device 210 in conjunction with data exchange application 204. For example, the data exchange application 212 can receive requests from data exchange application 204 to obtain data exchange options from a third party service provider (e.g., third party service provider 216). As another example, data exchange application 212 can perform operations for provisioning data exchange account information on the user device 202. For instance, when provisioning a new payment method at user device 202, data exchange application 212 can receive tokens from a payment provider (e.g., a bank) and transmit the token to the user device 202 for storage within a secure element of the user device 202.

The server device 210 can also maintain service provider information 214. As described briefly above, the service provider information 214 can include information usable to identify and establish communications with the third party service providers (e.g., third party service provider 216) that are available to provide data exchange options and/or data exchange accounts to support a data exchange session. The service provider information 214 can include, as a non-limiting example, identifiers for the third party service provider (e.g., bank identification numbers), network resources (e.g., uniform resource locators), certificates to enable cryptographically secure communications (e.g., transport layer security certificates), and identifiers for associated applications and stores (e.g., online web stores) that have an existing relationship with the third party service provider. The server device 210 can use the service provider information 214 to communicate with the corresponding third party service provider to determine available data exchange accounts, obtain data exchange options, or establish a separate workflow between the user device 202 and the third party service provider for creating a new data exchange account.

The third party service provider 216 can be an entity that facilitates mechanisms for data exchange between the user device 202 and terminal device 208. For example, the third party service provider 216 can be a bank that issues payment cards (e.g., a credit card) to a user 206. The payment card can therefore be associated with an account, which can be a particular example of a data exchange account. The user device 202 and the data exchange application 204 can then be used to create a virtual "wallet" for the payment card to support payment transactions. The user device 202 can include a secure data storage element for storing tokens associated with the data exchange account that can be used as part of the data exchange with the terminal device 208. For example, the tokens can be an encrypted identifier that corresponds to the user device 202 and the payment card, so that only the third party service provider 216 can decrypt the token and confirm the validity of a data exchange using the token. When new data exchange accounts are created, a new token can be generated by the third party service provider 216 and provided to the user device 202 via the server device 210. In some embodiments, the server device 210 may be controlled by an entity associated with the user device 202 so that communications between the data exchange application 204 and the server device 210 may be trusted and provide enhanced data security as compared to communications directly between the data exchange application 204 and the third party service provider 216.

As described previously, one of the advantages of the techniques described herein is avoiding the terminal device 208 receiving information about the data exchange options that may be available to user 206 from third party service provider 216 directly from third party service provider 216. The data exchange between the user device 202 and the terminal device 208 can be verified by the terminal device through exchange processing network 218. Exchange processing network 218 can be a computing network configured to handle data exchange verification requests from the terminal device 208. For example, exchange processing network 218 may be a payments processing network that can be used to mediate a transaction verification request from the terminal device 208 (e.g., a POS) and the third party service provider 216 (e.g., a bank issuing a payment card). The data exchange verification from the terminal device 208 and the exchange processing network 218 can proceed for a data exchange that operates using a data exchange option (e.g., a non-currency payment) as it does for a conventional data exchange. However, data security is improved by obtaining and confirming the data exchange options and through the communication path between the user device 202, the server device 210, and the third party service provider 216 rather than via the terminal device 208 and exchange processing network 218.

Figure 3:
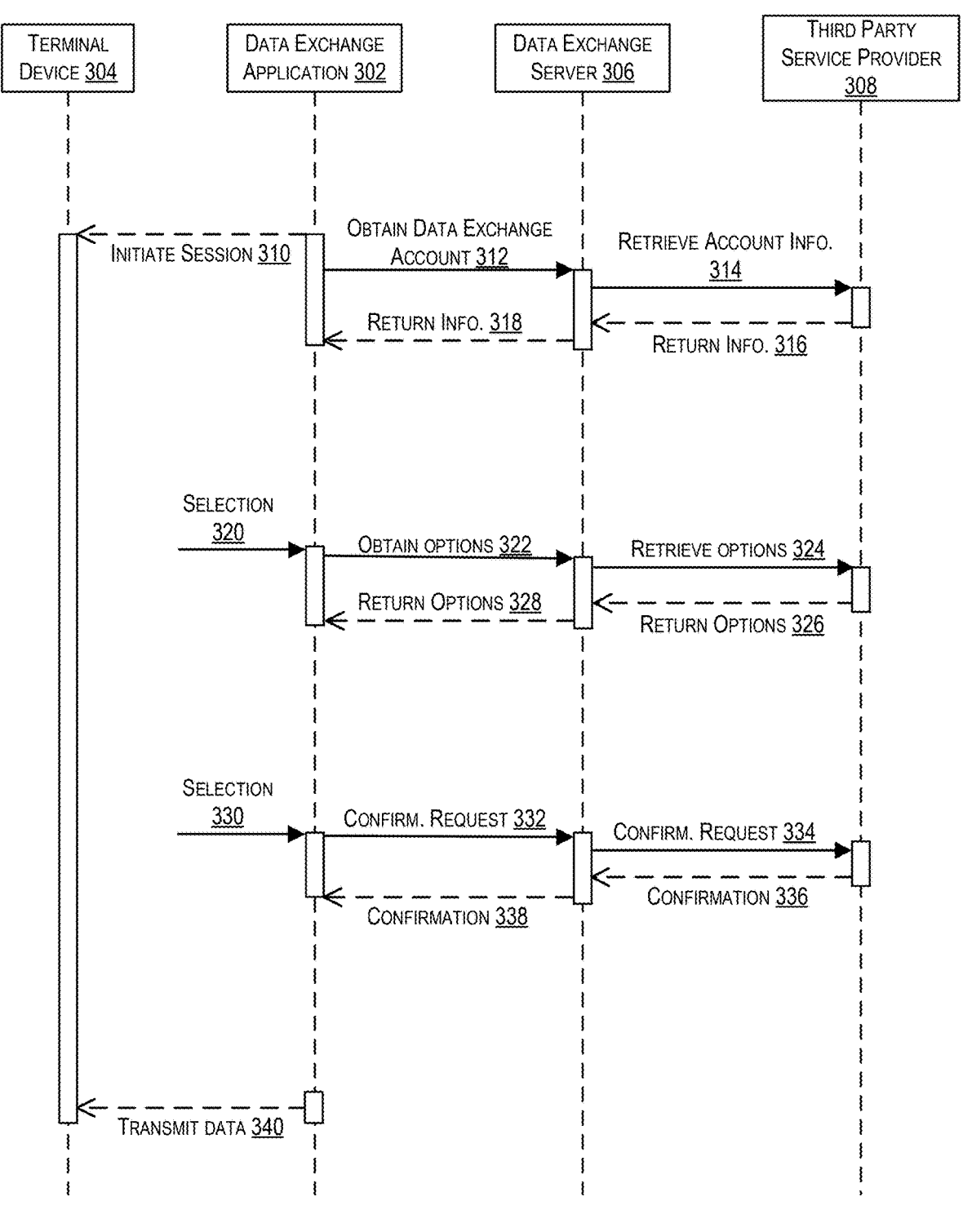
FIG. 3 is a sequence diagram illustrating operations of an example data flow for using a data exchange option in a data exchange session, according to some embodiments.

FIG. 3 is a sequence diagram illustrating operations of an example data flow 300 for using a data exchange option in a data exchange session, according to some embodiments. The data flow 300 can occur in a system implementing a data exchange session, for example the system 200 of FIG. 2. The system can include a user device executing a data exchange application 302, a terminal device 304, a data exchange server 306, and a third party service provider 308. Each of these systems and devices may be similar to other similarly named systems and devices described herein. For example, data exchange application 302 may be an example of data exchange application 204 of FIG. 2, terminal device 304 may be an example of terminal device 208 of FIG. 2, data exchange server 306 may be an example of server device 210 of FIG. 2, and third party service provider 308 may be an example of third party service provider 216 of FIG. 2.

In data flow 300, the data exchange application 302 can initiate a data exchange session 310 with the terminal device 304. Initiating the data exchange session can include establishing a communication channel with the terminal device 304, for example, via a near-field communication connection or via a network connection over the internet or other network.

Once the data exchange session has been initiated, the data exchange application 302 can obtain a data exchange account 312 by communicating with data exchange server 306. In some embodiments, data exchange account information may be stored on the user device hosting the data exchange application 302. For example, the data exchange application 302 can obtain a data exchange account without calling data exchange server 306.

The data exchange server 306 can retrieve account information 314 from the third party service provider 308. For example, for an existing data exchange account, the data exchange server 306 can retrieve additional information related to that account from the third party service provider 308. The additional information can identify that the associated data exchange account has data exchange options available from the third party service provider 308. The data exchange account information can be returned 316 to the data exchange server 306, and then subsequently returned 318 from the data exchange server 306 to the data exchange application 302.

In some embodiments, the data exchange application 302 can present the data exchange account at an interface of the user device. The data exchange account may be presented as one of several data exchange accounts available for use in the data exchange session. For example, a user may have several payment options available and presented for use in the data exchange session. Using the data exchange account information retrieved from the third party service provider, the data exchange application 302 can provide an indication at the interface that data exchange options are available for one or more of the presented data exchange accounts.

The data exchange application 302 can receive a selection 320 of a data exchange account having associated data exchange options. In some embodiments, the user may select a data exchange account without a prior indication of associated data exchange options. The data exchange application 302 can obtain data exchange options 322 from the data exchange server 306. The data exchange server 306 can then request 324 the available data exchange options from the third party service provider 308. The request may be based on the association of the data exchange account with the third party service provider 308 that the data exchange server 306 may maintain (e.g., as service provider information 214 of FIG. 2). The third party service provider 308 can return 326 the data exchange options to the data exchange server 306. Subsequently, the data exchange server 306 can return 328 the available data exchange options to the data exchange application 302. As described previously, a particular example of a data exchange option may be an installment payment mechanism. The third party service provider 308 may be a bank and may offer an installment payment plan in association with a payment method. When completing the payment session, a user can select the installment option. If the installment option is approved, the payment can be completed with a typical payment transaction with the terminal device 304, but with the third party service provider 308 structuring the resolution of the data exchange according to the installment option.

The data exchange application 302 can present the data exchange options at the interface of the user device hosting the data exchange application 302. The data exchange application 302 can receive 330 a selection of one of the data exchange options. In response, the data exchange application 302 can transmit 332 a confirmation request to the data exchange server 306. The data exchange server 306 can then transmit 334 the confirmation request to the third party service provider 308. The third party service provider 308 can confirm that the selected data exchange option is accepted for completing the data exchange and transmit 336 the confirmation back to the data exchange server 306, which can then transmit 338 the confirmation to the data exchange application 302.

After receiving the confirmation, the data exchange application 302 can complete the data exchange session by transmitting data 340 to the terminal device 304. The data can include information (e.g., a data cryptogram) that is usable by the terminal device 304 to verify the transaction with the third party service provider 308 by way of a conventional verification channel (e.g., exchange processing network 218 of FIG. 2).

Figure 4:
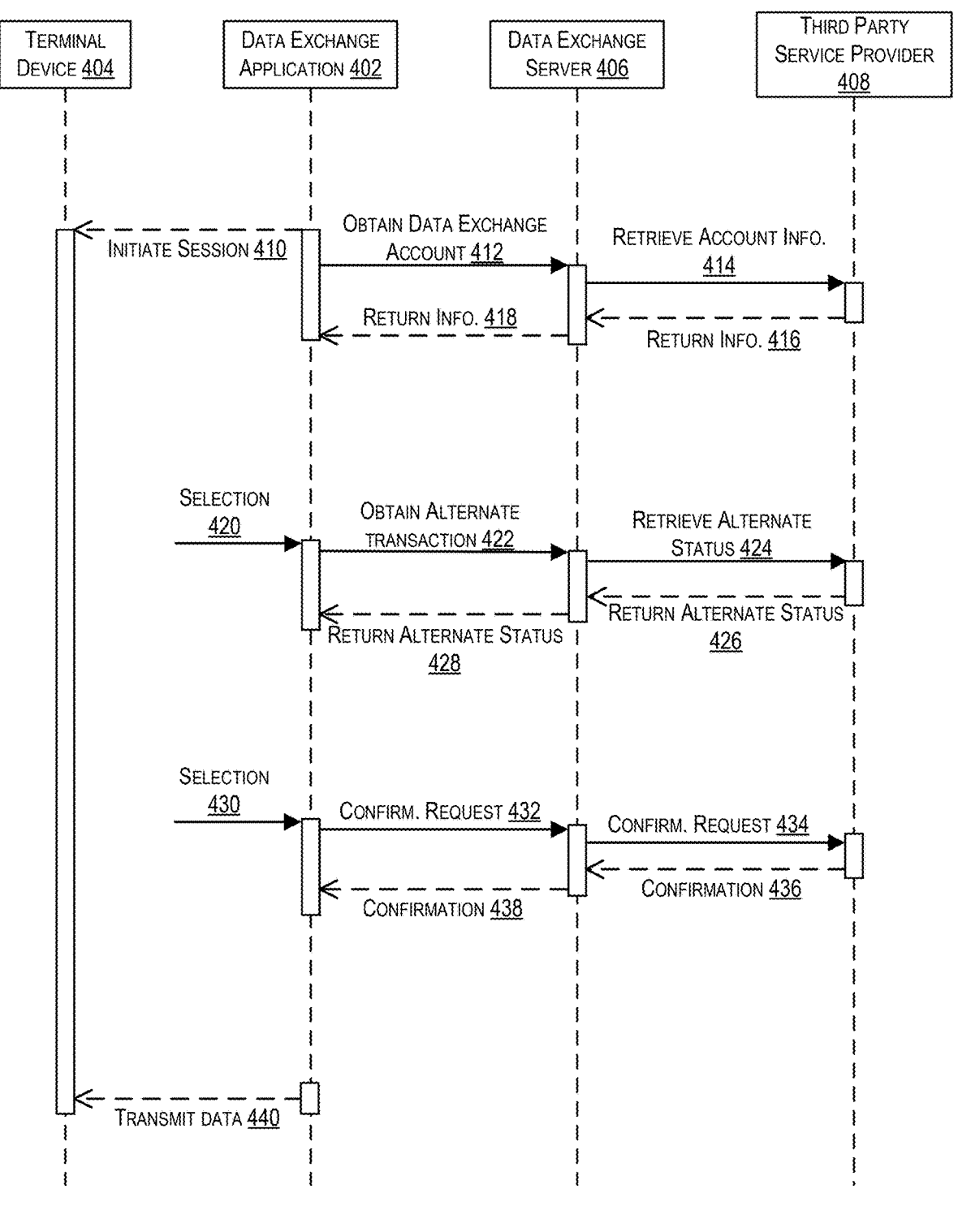
FIG. 4 is another sequence diagram illustrating operations of an example data flow for using alternate status in a data exchange session, according to some embodiments.

FIG. 4 is another sequence diagram illustrating operations of an example data flow 400 for using alternate status in a data exchange session, according to some embodiments. As with data flow 300, data flow 400 can occur in a system implementing a data exchange session, for example the system 200 of FIG. 2. The system can include a user device executing a data exchange application 402, a terminal device 404, a data exchange server 406, and a third party service provider 408. Each of these systems and devices may be similar to the similarly named systems and devices described with respect to FIG. 3. For example, data exchange application 402 may be an example of data exchange application 302, terminal device 404 may be an example of terminal device 304, data exchange server 406 may be an example of data exchange server 306, and third party service provider 408 may be an example of third party service provider 308.

The initial operations of data flow 400 are similar to the initial operations of data flow 300. In data flow 400, the data exchange application 402 can initiate a data exchange session 410 with the terminal device 404. Initiating the data exchange session can include establishing a communication channel with the terminal device 404, for example, via a near-field communication connection or via a network connection over the internet or other network.

Once the data exchange session has been initiated, the data exchange application 402 can obtain a data exchange account 412 by communicating with data exchange server 406. In some embodiments, data exchange account information may be stored on the user device hosting the data exchange application 402. For example, the data exchange application 402 can obtain a data exchange account without calling data exchange server 406.

The data exchange server 406 can retrieve account information 414 from the third party service provider 408. For example, for an existing data exchange account, the data exchange server 406 can retrieve additional information related to that account from the third party service provider 408. The additional information can identify that the associated data exchange account has data exchange options available from the third party service provider 408. The data exchange account information can be returned 416 to the data exchange server 406, and then subsequently returned 418 from the data exchange server 406 to the data exchange application 402.

In some embodiments, the data exchange application 402 can present the data exchange account at an interface of the user device. The data exchange account may be presented as one of several data exchange accounts available for use in the data exchange session. For example, a user may have several payment options available and presented for use in the data exchange session. Using the data exchange account information retrieved from the third party service provider, the data exchange application 402 can provide an indication at the interface that an alternate transaction is available for one or more of the presented data exchange accounts. The alternate transaction may be, for example, an ability to conduct the data exchange using an alternative mechanism such as a non-currency mechanism like reward points for a payment.

The data exchange application 402 can receive a selection 420 of a data exchange account having associated alternate transactions. In some embodiments, the user may select a data exchange account without a prior indication of an alternate transaction. The data exchange application 402 can obtain alternate transactions 422 from the data exchange server 406. The data exchange server 406 can then request 424 the alternate transaction status from the third party service provider 408. For example, for a non-currency payment, the data exchange server 406 can retrieve a rewards points balance associated with the data exchange account. The request may be based on the association of the data exchange account with the third party service provider 408 that the data exchange server 406 may maintain (e.g., as service provider information 214 of FIG. 2). The third party service provider 408 can return 426 the alternate transaction status to the data exchange server 406. Subsequently, the data exchange server 406 can return 428 the alternate transaction status to the data exchange application 402. As described previously, a particular example of a data exchange option may be non-currency payment mechanism. The third party service provider 408 may be a bank and may offer the ability to pay for an item or service using rewards points or other non-currency mechanisms through a payment method. When completing the payment session, a user can select the non-currency alternate transaction. If the alternate transaction is approved, the payment can be completed with a typical payment transaction with the terminal device 404, but with the third party service provider 408 structuring the resolution of the data exchange according to the non-currency alternative.

The data exchange application 402 can present the alternative transactions at the interface of the user device hosting the data exchange application 402. The data exchange application 402 can receive 430 a selection of one of the alternative transactions. In response, the data exchange application 402 can transmit 432 a confirmation request to the data exchange server 406. The data exchange server 406 can then transmit 434 the confirmation request to the third party service provider 408. The third party service provider 408 can confirm that the selected alternative transaction is accepted for completing the data exchange (e.g., by confirming that a rewards point balance is sufficient to cover a cost associated with the payment transaction) and transmit 436 the confirmation back to the data exchange server 406, which can then transmit 438 the confirmation to the data exchange application 402.

After receiving the confirmation, the data exchange application 402 can complete the data exchange session by transmitting data 440 to the terminal device 404. The data can include information (e.g., a data cryptogram) that is usable by the terminal device 404 to verify the transaction with the third party service provider 408 by way of a conventional verification channel (e.g., exchange processing network 218 of FIG. 2).

Figure 5:
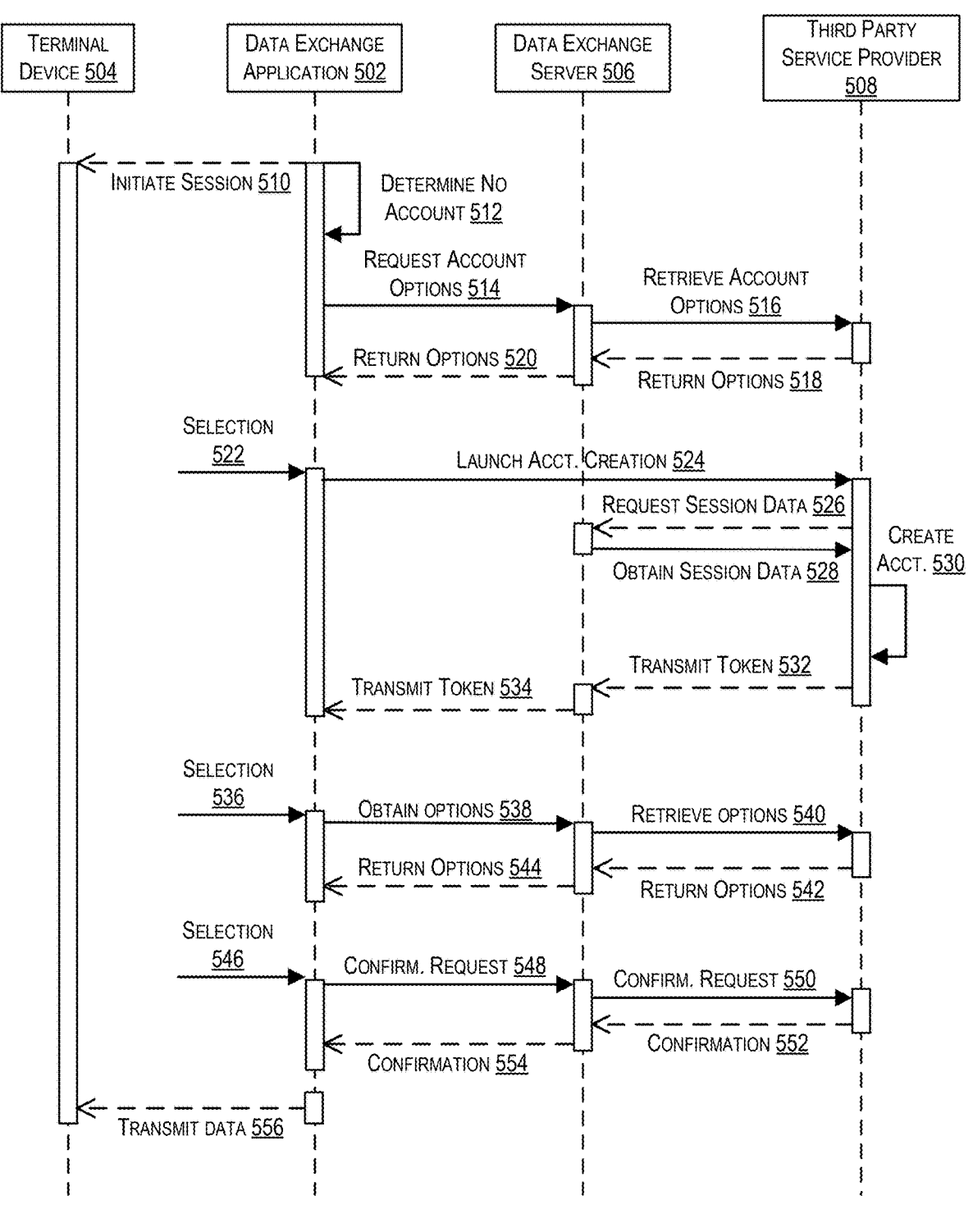
FIG. 5 is another sequence diagram illustrating operations of an example data flow for generating a new data exchange account in a data exchange session, according to some embodiments.

FIG. 5 is another sequence diagram illustrating operations of an example data flow 500 for generating a new data exchange account in a data exchange session, according to some embodiments. As with data flows 300 and 400, data flow 500 can occur in a system implementing a data exchange session, for example the system 200 of FIG. 2. The system can include a user device executing a data exchange application 502, a terminal device 504, a data exchange server 506, and a third party service provider 508. Each of these systems and devices may be similar to the similarly named systems and devices described with respect to FIGS. 3 and 4. For example, data exchange application 502 may be an example of data exchange application 302, terminal device 504 may be an example of terminal device 304, data exchange server 506 may be an example of data exchange server 306, and third party service provider 508 may be an example of third party service provider 308.

In data flow 500, the data exchange application 502 can initiate a data exchange session 510 with the terminal device 504. Initiating the data exchange session can include establishing a communication channel with the terminal device 504, for example, via a near-field communication connection or via a network connection over the internet or other network.

Once the data exchange session has been initiated, the data exchange application 502 can determine 512 that no data exchange account exists with respect to the data exchange application 502. For example, the data exchange application 502 may not yet have had any data exchange accounts associated with the user device. In some embodiments, determining that a data exchange account does not exist can include determining that a data exchange account from a particular third party service provider does not exist or has not yet been provisioned with the data exchange application 502. In some embodiments, determining that a data exchange account does not exist can include receiving an indication (e.g., from a user) that the data exchange session should be conducted using a particular third party service provider for which no data exchange account exists at the data exchange application 502.

The data exchange application 502 can request 514 data exchange account options from the data exchange server 506. The data exchange server 506 can then retrieve 516 available data exchange account options from third party service provider 508 as well as, in some embodiments, from one or more additional third party service providers. For example, the data exchange server 506 can retrieve from all the third party service providers for which the data exchange server 506 maintains information (e.g., service provider information 214 of FIG. 2) the available data exchange accounts that may be provisioned for the user device/data exchange application 502. The third party service provider 508 (as well as additional third party service providers) can return 518 the available data exchange account options to the data exchange server 506, after which the data exchange server 506 can return 520 the data exchange account options to the data exchange application 502.

The data exchange application 502 can present the available account options at the user device. The data exchange application 502 can then receive 522 a selection (e.g., from a user) of a particular data exchange account that should be provisioned at the data exchange application 502. In response, the data exchange application 502 can launch 524 an account creation workflow with the third party service provider 508. For example, the data exchange application can present a URL to a webpage for the third party service provider 508 which is selected by the user to launch the account creation workflow. In the account creation workflow, the third party service provider 508 can request 526 session data from the data exchange server 506. The session data can include information about the terminal device 504 (or the entity controlling terminal device 504) as well as indicators related to the validity of the request to create a new data exchange account (e.g., fraud indicators).

The third party service provider 508 can obtain 528 the session data and create 530 the data exchange account. As part of creating a new data exchange account, the third party service provider 508 may generate a token that can be used to provision the data exchange account with the particular user device hosting the data exchange application 502. For example, the third party service provider 508 can encrypt an identifier for the user device using cryptographic techniques, so that only the third party service provider 508 can decrypt the token when it is used in a data exchange to verify/validate the data exchange. The third party service provider 508 can transmit 532 the token to the data exchange server 506, as well as other information related to the new data exchange account. The data exchange server 506 can then transmit 534 the token to the data exchange application 502 for secure storage at the user device. The data exchange server 506 may not itself store the token.

The remaining operations 536-556 of data flow 500 are similar to portions of data flow 300 for determining available data exchange options. The data exchange application 502 can receive a selection 536 of the new data exchange account. The data exchange application 502 can obtain 538 data exchange options from the data exchange server 506. The data exchange server 506 can then retrieve 540 the available data exchange options from the third party service provider 508. The third party service provider 508 can return 542 the data exchange options to the data exchange server 506. Subsequently, the data exchange server 506 can return 544 the available data exchange options to the data exchange application 502.

The data exchange application 502 can present the data exchange options at the interface of the user device hosting the data exchange application 502. The data exchange application 502 can receive 546 a selection of one of the data exchange options. In response, the data exchange application 502 can transmit 548 a confirmation request to the data exchange server 506. The data exchange server 506 can then transmit 550 the confirmation request to the third party service provider 508. The third party service provider 508 can confirm that the selected data exchange option is accepted for completing the data exchange and transmit 552 the confirmation back to the data exchange server 506, which can then transmit 554 the confirmation to the data exchange application 502.

After receiving the confirmation, the data exchange application 502 can complete the data exchange session by transmitting 556 data to the terminal device 504. The data can include information (e.g., a data cryptogram including the token) that is usable by the terminal device 504 to verify the transaction with the third party service provider 508 by way of a conventional verification channel (e.g., exchange processing network 218 of FIG. 2).

Figure 6:
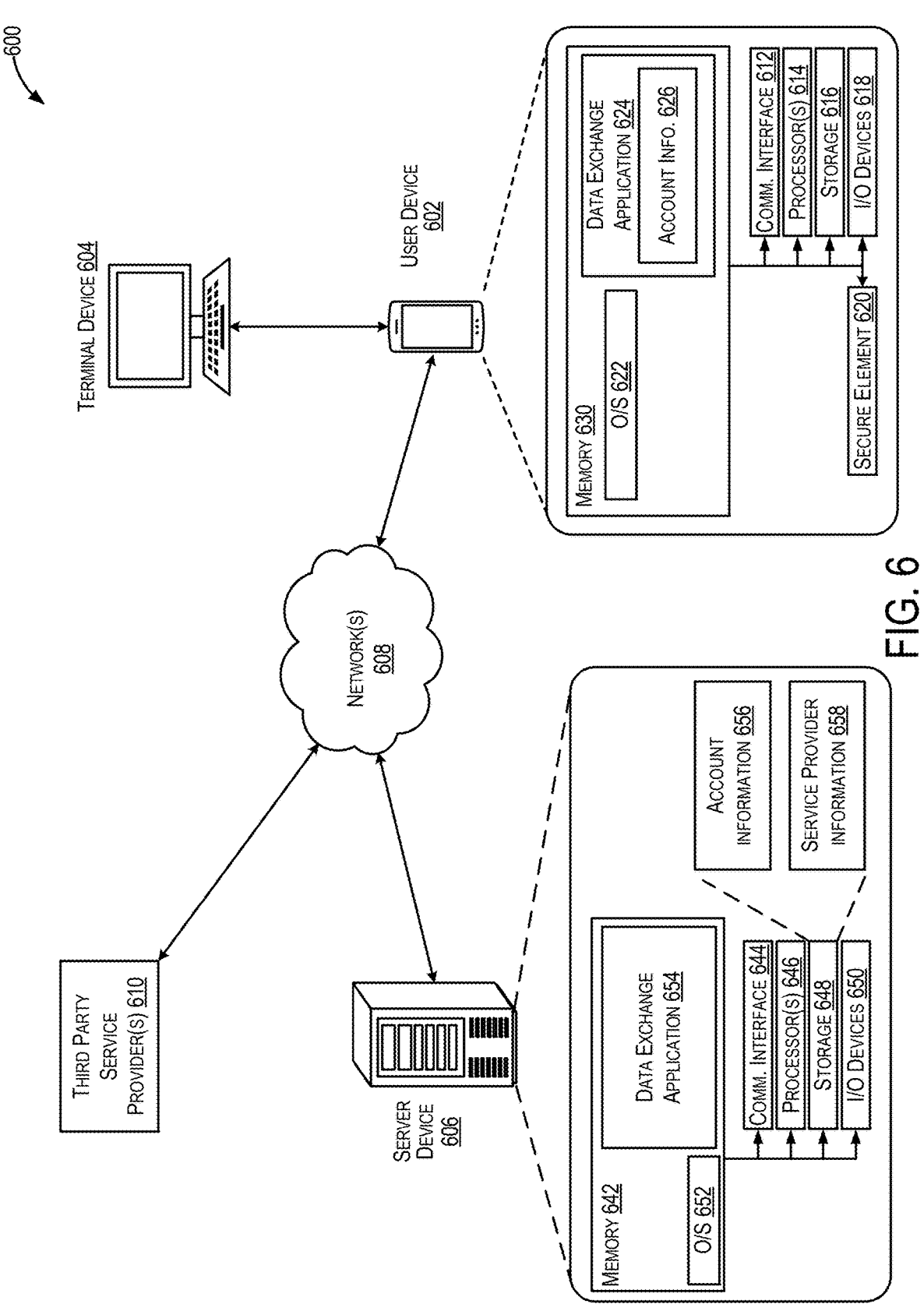
FIG. 6 illustrates an example architecture of a system that can implement techniques for data exchange options in a data exchange session between a user device and a terminal device, according to some embodiments.

FIG. 6 illustrates an example architecture of a system 600 that can implement techniques for data exchange options in a data exchange session between a user device 602 and a terminal device 604, according to some embodiments. The system 600 includes the user device 602 (e.g., a mobile device, a smart phone, or other suitable computing device), the terminal device 604, a server device 606, one or more network(s) 608, and third party service provider(s) 610. The server device 606 may be an example of server device 106 of FIG. 1. The server device 606 can be one or more remote computing devices, including cloud devices. Each of these elements depicted in FIG. 6 may be similar to one or more elements depicted in other figures described herein. In some embodiments, at least some elements of system 600 may be used to perform data exchange operations in a data exchange session. The network(s) 608 may include any one or a combination of many different types of networks, such as cable networks, the Internet, wireless networks, cellular networks, and other private and/or public networks.

As described herein, the user device 602 can have at least one memory 630, a communications interface 612, one or more processing units (or processor(s)) 614, a storage 616, one or more input/output ("I/O") device(s) 618, and a secure element 620. The processor(s) 614 may be implemented as appropriate in hardware, computer-executable instructions, firmware or combinations thereof. Computer-executable instruction or firmware implementations of the processor(s) 614 may include computer-executable or machine executable instructions written in any suitable programming language to perform the various functions described. The I/O device(s) 618 can include displays, monitors, touch screens, mouse, keyboard, or other I/O device. The secure element 620 may be a secure storage for storing cryptographically secure data associated with data exchange accounts. For example, the secure element 620 may be a secure portion of the storage 616 (e.g., an enclave) or a storage on dedicated hardware module (e.g., a hardware security module, a trusted platform module, etc.).

The memory 630 may store program instructions that are loadable and executable on the processor(s) 614, as well as data generated during the execution of these programs, transaction information, data exchange account information, and the like. Depending on the configuration and type of user device 602, the memory 630 may be volatile (such as random access memory ("RAM")) or non-volatile (such as read-only memory ("ROM"), flash memory, etc.). In some implementations, the memory 630 may include multiple different types of memory, such as static random access memory ("SRAM"), dynamic random access memory ("DRAM") or ROM. The user device 602 may also include additional storage 616, such as either removable storage or non-removable storage including, but not limited to, magnetic storage, optical disks, and/or tape storage. The disk drives and their associated computer-readable media may provide non-volatile storage of computer-readable instructions, data structures, program components, and other data for the computing devices. In some embodiments, the storage 616 may be utilized to store data contents received from one or more other devices (e.g., server device 606). For example, the storage 616 may store received data exchange account information.

The memory 630 may include an operating system (O/S) 622 and one or more application programs, software components, or services for implementing the features disclosed herein, including a data exchange application 624. The data exchange application 624 may be configured to execute a data exchange session (e.g., between terminal device 604) for exchanging data related to a transaction. The data exchange application 624 can be configured to maintain data exchange account information 626 for one or more data exchange accounts associated with the user device 602. For example, the data exchange application 624 may be a virtual wallet storing account information 626 that identifies payment methods (e.g., credit cards, bank cards, etc.) usable during a data exchange session with the terminal device 604. data exchange application 624 can send requests for data exchange account information like data exchange options and alternative transaction information to server device 604 (e.g., via communications interface 612) and subsequently receive the requested information. Similarly, the data exchange application 624 can transmit data (e.g., data cryptograms) to the terminal device 604 via communications interface 612.

The user device 602 may also contain a communications interface 612 that allows the user device 602 to communicate with the terminal device 604, another computing device or server including server device 606, third party service providers 610, or other devices on the network(s) 608. The communications interface 612 can include a near-field communication (NFC) interface. The user device 602 may also include I/O device(s) 618, such as for enabling connection with a keyboard, a mouse, a pen, a voice input device, a touch input device, a display, speakers, a printer, etc.

Terminal device 604 can be a computing device configured to perform operations of data exchange session with a user device, including user device 602. In some embodiments, the terminal device can be a point of sale (POS) terminal configured for processing payment transactions with an exchange of transaction data with the user device. In some embodiments, the terminal device 604 can be one or more server devices (e.g., web servers, including cloud-implemented web servers) that can provide network resources (e.g., webpages) to process payment transactions for a web-based payment (e.g., via an e-commerce web site).

Turning now to server device 606 in more detail, the server device 606 can be any suitable type of computing system including, but not limited to, a laptop computer, a desktop computer, a mobile phone, a smartphone, a server computer, etc. In some embodiments, the server device 606 is executed by one or more virtual machines implemented within a cloud computing or other hosted environment. The cloud computing environment may include provisioned computing resources like compute, storage, and networking. The server device 606 can communicate with the user device 602 via the network(s) 608 or other network connections. The server device 606 may be configured to implement the functionality described herein as part of a distributed computing environment.

The server device 606 can include a memory 642, one or more processor(s) 646, I/O devices 650, and at least one storage unit 648. As with the processor(s) 614 of user device 602, the processor(s) 646 may be implemented as appropriate in hardware, computer-executable instructions, software, firmware, or combinations thereof. Computer-executable instruction, software, or firmware implementations of the processor(s) 646 may include computer-executable or machine-executable instructions written in any suitable programming language to perform the various functions described. The memory 642 may store program instructions that are loadable and executable on the processor(s) 646, as well as data generated during the execution of these programs. Depending on the configuration and type of memory included in the server device 606, the memory 642 may be volatile (such as RAM) and/or non-volatile (such as read-only memory ("ROM"), flash memory, or other memory). In some embodiments, the storage 648 may include one or more databases, data structures, data stores, or the like for storing and/or retaining information associated with the server device 606 or the user device 602. The storage 648 may include data stores for storing data exchange account information 656 and third party service provider information 658, which may be provided by third party service provider(s) 610.

The memory 642 may include an operating system (O/S) 652 and one or more application programs, components, or services for implementing the features disclosed herein, including data exchange application 654. The data exchange application 654 may be configured to transmit data exchange account information (e.g., data exchange options, alternative transactions) to the user device 602 and the data exchange application 624 in response to requests from the user device 602. In some embodiments, the storage 648 may include one or more databases, data structures, data stores, or the like for storing and/or retaining information associated with the server device 606 or the user device 602.

As with the user device 602, the server device 606 may contain a communications interface 644 that allows the server device 606 to communicate with user device 602, a stored database, another computing device or server, or third party service provider(s) 610. The server device 606 may also include I/O device(s) 650, such as for enabling connection with a keyboard, a mouse, a pen, a voice input device, a touch input device, a display, speakers, a printer, etc.

The third party service provider(s) 610 can be systems, including cloud-based server devices, that are accessible to the user device 602 and the server device 606 over the network(s) 608. For example, the third party service provider(s) 610 may be computing systems associated with one or more payment card issuers like banks that can provision payment methods with the user device 602 in conjunction with the server device 606.

FIG. 7 illustrates an example process 700 for determining a data exchange option for use in a data exchange session between an application executing at a user device and a terminal device, according to some embodiments. The process 700 may be performed by the application (e.g., data exchange application 302 of FIG. 3). Some of the operations described with respect to process 700 may be similar to operations described above with respect to data flows 300 and 400 of FIGS. 3 and 4, respectively.

Process 700 may begin at block 702, with the application initiating a data exchange session with a terminal device (e.g., terminal device 304 of FIG. 3). The data exchange session can include the exchange of data between a user device and the terminal device to effect a transaction. For example, the data exchange session can be a payment transaction for a good or service, in which the user device and the application are configured to provide payment information to the terminal device. In some embodiments, initiating the data exchange session can include using a near-field communication (NFC) protocol. For example, the user device hosting the application may be brought near the terminal device to initiate the data exchange session using an NFC interface. In some embodiments, initiating the data exchange session can include using a network resource provided by the terminal device. For example, for a web-based payment transaction, the terminal device may be a server providing a payment gateway or other webpage for conducting the payment transaction. Initiating the data exchange session can include requesting the payment webpage from the terminal device.

At block 704, the application can determine a data exchange account associated with a third party service provider. The application may be provisioned with one or more data exchange accounts for conducting data exchange sessions. For example, the data exchange accounts may be payment methods like credit cards provided by a card issuing bank. The application can determine the data exchange accounts that are available to conduct the data exchange with the terminal device. In some embodiments, the application can receive information from the terminal device regarding the type of data exchange accounts that are acceptable for conducting the data exchange session. The application can use this information to determine suitable data exchange accounts from the available data exchange accounts provisioned with the application.

In some embodiments, the application can obtain a plurality of data exchange accounts from the server device. For example, the server device may provide information about which data exchange accounts are available for use in the data exchange session. Obtaining the data exchange accounts can occur in response to the initiation of the data exchange session. The application can then present the plurality of data exchange accounts at a display of the user device. For example, the application can present the available payment cards that can be used in the pending data exchange session. In some embodiments, determining the data exchange account comprises receiving a selection of the data exchange account from the plurality of data exchange accounts presented at the display of the user device. For example, a user can select from the presented payment methods to determine the payment method to be used in the pending data exchange session.

At block 706, the application can obtain, from a server device, a data exchange option corresponding to the data exchange account. The data exchange option may be provided by the third party service provider associated with the data exchange account. For example, the data exchange option can be an installment payment plan offered by the issuing bank of selected credit card payment method. The server device can maintain association information for the third party service provider. For example, the association information can include third party service provider information (e.g., service provider information 214 of FIG. 2) that allows the server device to communicate securely with the third party service provider to retrieve the available data exchange options.

In some embodiments, the data exchange option comprises information usable by the third party service provider to validate the data cryptogram transmitted from the application to the terminal device. For example, the data exchange option can be an installment payment plan. After the application transmits data in the data exchange session with the terminal device, the terminal device can validate the transaction with the third party service provider (e.g., via an exchange processing network 218 of FIG. 2). During the validation process, the third party service provider can verify the transaction and then use the information in the data exchange option to process the transaction according to the installment payment plan. The terminal device may not receive any information usable to identify that the transaction was completed using the data exchange option rather than a typical transaction. In addition, in some embodiments, the terminal device may not maintain the association information for the third party service provider.

In some embodiments, obtaining the data exchange option can include the application receiving, from the server device, a plurality of data exchange options determined based at least in part on the association information and the data exchange account. For example, the application can retrieve multiple available data exchange options associated with the data exchange account.

In some embodiments, the data exchange option may be an alternative transaction type. For example, for a data exchange account that is a payment method, a non-currency alternative may be available from the associated third party service provider to enable the transaction. The application can determine the alternative transaction, receive confirmation that the alternative transaction will be accepted by the third party service provider when validating the transaction with the terminal device, and then complete the data exchange with the terminal device.

At block 708, the application can receive an indication that the data exchange option was selected. For example, a user may select from among the data exchange options presented at a display of the user device. Responsive to the indication, the application can transmit a confirmation request to the server device, at block 710. The confirmation request can be associated with the data exchange option. For example, the confirmation request may be a request to confirm that the selected data exchange option will be used by the third party service provider when validating and completing the transaction with the terminal device.

At block 712, the application can receive, in response to the confirmation request, a confirmation that the data exchange option is approved by the third party service provider. At block 714, responsive to the confirmation, the application can transmit to the terminal device a data cryptogram. The data cryptogram can include information usable to identify the data exchange account. For example, the data cryptogram can include a token usable to identify the data exchange account and the user device. The terminal device may send the token to an exchange processing network that can communicate with the third party service provider to validate the token. In some embodiments, the data cryptogram does not include information identifying the data exchange option. For example, the data exchange session between the user device and the terminal device may occur as if by a typical transaction that does not use the data exchange option, so that the terminal device concludes the transaction by validating the transaction according to typical methods. The data exchange option is then implemented by the third party service provider and communicated to the application at the user device.

FIG. 8 illustrates an example process 800 for creating a new data exchange account for use in a data exchange session between an application executing at a user device and a terminal device, according to some embodiments. The process 800 may be performed by the application (e.g., data exchange application 502 of FIG. 5). Some of the operations described with respect to process 800 may be similar to operations described above with respect to data flow 500 of FIG. 5.

Process 800 may begin at block 802, with the application initiating a data exchange session with a terminal device (e.g., terminal device 504 of FIG. 5). The data exchange session can include the exchange of data between a user device and the terminal device to effect a transaction. For example, the data exchange session can be a payment transaction for a good or service, in which the user device and the application are configured to provide payment information to the terminal device. In some embodiments, initiating the data exchange session can include using a near-field communication (NFC) protocol. For example, the user device hosting the application may be brought near the terminal device to initiate the data exchange session using an NFC interface. In some embodiments, initiating the data exchange session can include using a network resource provided by the terminal device. For example, for a web-based payment transaction, the terminal device may be a server providing a payment gateway or other webpage for conducting the payment transaction. Initiating the data exchange session can include requesting the payment webpage from the terminal device.

At block 804, the application can determine that a data exchange account is not associated with the user device. For example, the application may not yet have had any data exchange accounts associated with the user device. In some embodiments, determining that a data exchange account does not exist can include determining that a data exchange account from a particular third party service provider does not exist or has not yet been provisioned with the application. In some embodiments, determining that a data exchange account does not exist can include receiving an indication (e.g., from a user) that the data exchange session should be conducted using a particular third party service provider for which no data exchange account exists at the application.

At block 806, the application can obtain, from a server device, a list comprising a plurality of third party service providers. For example, the server device can retrieve from all the third party service providers for which the server device maintains information (e.g., service provider information 214 of FIG. 2) the available data exchange accounts that may be provisioned for the user device/application. The server device can return the data exchange account options to the application as the list.

At block 808, the application can present the list at a display of the user device. At block 810 the application can receive receiving an indication that a third party service provider of the plurality of third party service providers has been selected. For example, a user can select one of the third party service providers from the list to proceed with the creation of a data exchange account.

At block 812, in response to the indication, the application can transmit, a request to associate the data exchange account with the user device. The request can be transmitted to the server device. The data exchange account can be provided by the third party service provider. For example, the data exchange application can present a URL to a webpage for the third party service provider which is selected by the user to launch the account creation workflow. In the account creation workflow, the third party service provider can create the data exchange account. As part of creating a new data exchange account, the third party service provider may generate a token that can be used to provision the data exchange account with the particular user device hosting the application. In some embodiments, the token can include information usable by the third party service provider to validate a data cryptogram transmitted from the application to the terminal device. For example, the third party service provider can encrypt an identifier for the user device using cryptographic techniques, so that only the third party service provider can decrypt the token when it is used in a data exchange to verify/validate the data exchange. The third party service provider can transmit the token to the server device, as well as other information related to the new data exchange account. The server device can then transmit the token to the application for secure storage at the user device. The server device may not itself store the token.

At block 814, the application can receive data exchange account information comprising a token associating the user device with the data exchange account. At block 816, the application can transmit, to the terminal device, a data cryptogram comprising information usable to identify the data exchange account, the data cryptogram generated by the application using the token. In some embodiments, the data cryptogram can include the token.

In some embodiments, once a data exchange account has been created, the application can determine a data exchange option as described above with respect to process 700 of FIG. 7. The application can obtain a data exchange option corresponding to the data exchange account and provided by the third party service provider. The server device can maintain association information for the third party service provider. The application can then receive an indication that the data exchange option was selected and, responsive to the indication, transmit, to the server device, a confirmation request associated with the data exchange option. The application can subsequently receive a confirmation that the data exchange option is approved by the third party service provider and then proceed with the data exchange session with the terminal device.

Illustrative methods and devices for using data exchange options in a data exchange session are described above. Some or all of these devices and methods may, but need not, be implemented at least partially by architectures such as those shown at least in FIG. 6. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In examples utilizing a network server, the network server can run any of a variety of server or mid-tier applications, including HTTP servers, FTP servers, CGI servers, data servers, Java servers, and business application servers. The server(s) may also be capable of executing programs or scripts in response to requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or browser. It should be appreciated that alternate examples may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable media for containing code, or portions of code, can include any appropriate media known or used in the art, including storage media, such as, but not limited to, volatile and non-volatile, removable and non-removable media implemented in any method or technology for storage of information such as computer-readable instructions, data structures, program modules, or other data, including RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a system device. Based at least in part on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

As described above, one aspect of the present technology is the gathering and use of data to improve the functioning of data exchange between user devices and various third party devices. The present disclosure contemplates that in some instances, this gathered data may include personally identifiable information (PII) data that uniquely identifies or can be used to contact or locate a specific person. Such personal information data can include demographic data, location-based data (e.g., GPS coordinates), telephone numbers, email addresses, Twitter ID's, home addresses, or any other identifying or personal information.

The present disclosure recognizes that the use of such personal information data, in the present technology, can be used to the benefit of users. For example, the personal information data can be used to obtain access to an application for locating peripheral devices associated with a user, user account, or a user device.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of services related to tracking a user's location (e.g., via the user's mobile device), the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

initiating, by an application executing on a user device, a data exchange session with a terminal device;

determining, by the application, that a data exchange account is not associated with the user device;

obtaining, by the application from a server device, a list comprising a plurality of third party service providers;

presenting, by the application, the list at a display of the user device;

receiving, by the application, an indication that a third party service provider of the plurality of third party service providers has been selected;

responsive to the indication, transmitting, by the application to the server device, a request to associate the data exchange account with the user device, the data exchange account provided by the third party service provider;

receiving, by the application from the server device, data exchange account information comprising a token associating the user device with the data exchange account; and transmitting, by the application to the terminal device within the data exchange session, a data cryptogram comprising information usable to identify the data exchange account, the data cryptogram generated by the application using the token.

2. The computer-implemented method of claim 1, further comprising:

obtaining, by the application from the server device, a data exchange option corresponding to the data exchange account and provided by the third party service provider, the server device maintaining association information for the third party service provider;

receiving, by the application, an indication that the data exchange option was selected;

responsive to the indication, transmitting, by the application to the server device, a confirmation request associated with the data exchange option; and receiving, by the application from the server device, a confirmation that the data exchange option is approved by the third party service provider.

3. The computer-implemented method of claim 1, wherein initiating the data exchange session comprises initiating the data exchange session using a near-field communication protocol.

4. The computer-implemented method of claim 1, wherein initiating the data exchange session comprises initiating the data exchange session using a network resource provided by the terminal device.

5. The computer-implemented method of claim 1, wherein the data exchange session comprises a payment session.

6. The computer-implemented method of claim 1, wherein the data exchange account comprises a payment method account.

7. The computer-implemented method of claim 1, wherein the token comprises information usable by the third party service provider to validate the data cryptogram transmitted from the application to the terminal device.

8. A user device, comprising:

one or more processors; and one or more memories storing computer-executable instructions that, when executed by the one or more processors, cause the user device to execute an application configured to at least:

initiate a data exchange session with a terminal device;

determine that a data exchange account is not associated with the user device;

obtain, from a server device, a list comprising a plurality of third party service providers;

present the list at a display of the user device;

receive an indication that a third party service provider of the plurality of third party service providers has been selected;

responsive to the indication, transmit, to the server device, a request to associate the data exchange account with the user device, the data exchange account provided by the third party service provider;

receive, from the server device, data exchange account information comprising a token associating the user device with the data exchange account; and transmit, to the terminal device within the data exchange session, a data cryptogram comprising information usable to identify the data exchange account, the data cryptogram generated by the application using the token.

9. The user device of claim 8, wherein the application is further configured to:

obtain, from the server device, a data exchange option corresponding to the data exchange account and provided by the third party service provider, the server device maintaining association information for the third party service provider;

receive an indication that the data exchange option was selected;

responsive to the indication, transmit, to the server device, a confirmation request associated with the data exchange option; and receive, from the server device, a confirmation that the data exchange option is approved by the third party service provider.

10. The user device of claim 8, wherein initiating the data exchange session comprises initiating the data exchange session using a near-field communication protocol.

11. The user device of claim 8, wherein initiating the data exchange session comprises initiating the data exchange session using a network resource provided by the terminal device.

12. The user device of claim 8, wherein the data exchange session comprises a payment session.

13. The user device of claim 8, wherein the data exchange account comprises a payment method account.

14. The user device of claim 8, wherein the token comprises information usable by the third party service provider to validate the data cryptogram transmitted from the application to the terminal device.

15. One or more non-transitory computer-readable media storing computer-executable instructions that, when executed by one or more processors of a user device, cause the one or more processors to execute an application configured to at least:

initiate a data exchange session with a terminal device;

determine that a data exchange account is not associated with the user device;

obtain, from a server device, a list comprising a plurality of third party service providers;

present the list at a display of the user device;

receive, an indication that a third party service provider of the plurality of third party service providers has been selected;

responsive to the indication, transmit, to the server device, a request to associate the data exchange account with the user device, the data exchange account provided by the third party service provider;

receive, from the server device, data exchange account information comprising a token associating the user device with the data exchange account; and transmit, to the terminal device within the data exchange session, a data cryptogram comprising information usable to identify the data exchange account, the data cryptogram generated by the application using the token.

16. The one or more non-transitory computer-readable media of claim 15, wherein the application is further configured to:

obtain, from the server device, a data exchange option corresponding to the data exchange account and provided by the third party service provider, the server device maintaining association information for the third party service provider;

receive an indication that the data exchange option was selected;

responsive to the indication, transmit, to the server device, a confirmation request associated with the data exchange option; and receive, from the server device, a confirmation that the data exchange option is approved by the third party service provider.

17. The one or more non-transitory computer-readable media of claim 15, wherein initiating the data exchange session comprises initiating the data exchange session using a near-field communication protocol.

18. The one or more non-transitory computer-readable media of claim 15, wherein initiating the data exchange session comprises initiating the data exchange session using a network resource provided by the terminal device.

19. The one or more non-transitory computer-readable media of claim 15, wherein the data exchange session comprises a payment session.

20. The one or more non-transitory computer-readable media of claim 15, wherein the data exchange account comprises a payment method account.

\* \* \* \* \*